US00RE34517E

United States Patent [19]

White

[11] E Patent Number: Re. 34,517

[45] Reissued Date of Patent: Jan. 25, 1994

[54] PET CAGE

[75] Inventor: Judith E. White, Elkhart, Ind.

[73] Assignee: Allyssa Industries, Inc., Elkhart, Ind.

[21] Appl. No.: 909,197

[22] Filed: Jul. 6, 1992

Related U.S. Patent Documents

Reissue of:

[64] Patent No.: 4,984,535
Issued: Jan. 15, 1991
Appl. No.: 409,575
Filed: Sep. 19, 1989

[51] Int. Cl.[5] ..... A01K 1/02
[52] U.S. Cl. ..... 119/17; 119/19
[58] Field of Search ..... 119/15, 17, 19, 96, 119/158

[56] References Cited

U.S. PATENT DOCUMENTS

| | | | |
|---|---|---|---|
| 2,897,781 | 8/1959 | Olson | 119/15 |
| 3,791,347 | 2/1974 | Lovell | 119/19 |
| 4,484,540 | 11/1984 | Yamamoto | 119/19 |
| 4,597,359 | 7/1986 | Moorman | 119/96 |
| 4,803,951 | 2/1989 | Davis | 119/19 |
| 4,878,359 | 11/1989 | Mandell | 119/15 X |

FOREIGN PATENT DOCUMENTS

| | | | |
|---|---|---|---|
| 2583022 | 12/1986 | France | 119/17 |

*Primary Examiner*—Gene Mancene
*Assistant Examiner*—Todd E. Manahas
*Attorney, Agent, or Firm*—James D. Hall

[57] ABSTRACT

A pet cage for carrying an animal in a vehicle. The pet cage includes a pet housing and an integral base. The base includes openings for accommodating a vehicle seat belt to secure the cage to the vehicle seat. A plurality of vent openings are formed in the pet housing two of which form a handle therebetween.

6 Claims, 1 Drawing Sheet

PET CAGE

Matter enclosed in heavy brackets [ ] appears in the original patent but forms no part of this reissue specification; matter printed in italics indicates the additions made by reissue.

SUMMARY OF THE INVENTION

This invention relates to an animal transportation device and has specific reference to a pet cage for use in a vehicle.

A pet cage having enclosed pet containment area and an integral base which is adapted for accommodating a vehicle seat belt therethrough to firmly attach the cage to the vehicle seat. With the cage securely fastened to the seat the pet is safely supported by a floor which is substantially horizontal and spaced above the vehicle seat. A plurality of vent openings are formed within the housing of the pet cage. A handle for carrying the cage is defined by two openings in the cage top wall. An interior intermediate horizontal wall extends across the cage to isolate the user's hand grasping the handle from the pet containment are thereby protecting the hand from injury from the animal. Doorways and hinged doors are provided in opposite side walls of the pet cage for allowing ingress and egress into the containment area.

Accordingly, it is an object of the invention to provide for a novel peg cage.

Another object of this invention is to provide for a pet cage which may be securely fastened to the vehicle seat by the vehicle seat belt traversing openings formed in the base.

Another object of the invention is to provide for a pet cage wherein the hand of a person carrying the cage is isolated from the pet containment area.

Other objects of this invention will become apparent upon a reading of the following description taken with the accompanying drawings.

BRIEF DESCRIPTION OF THE PREFERRED EMBODIMENT

Figure 3:
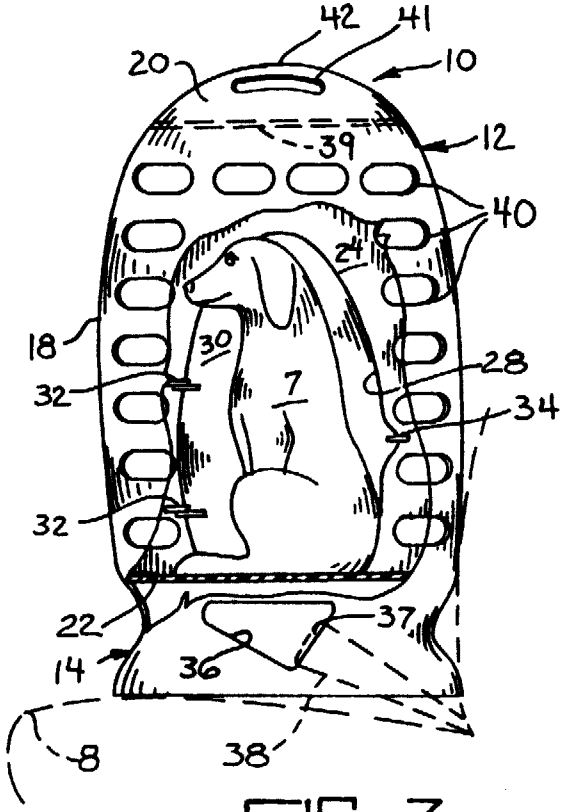
FIG. 3 is a side elevational view with portions cut away for illustrative purposes.
Figure 2:
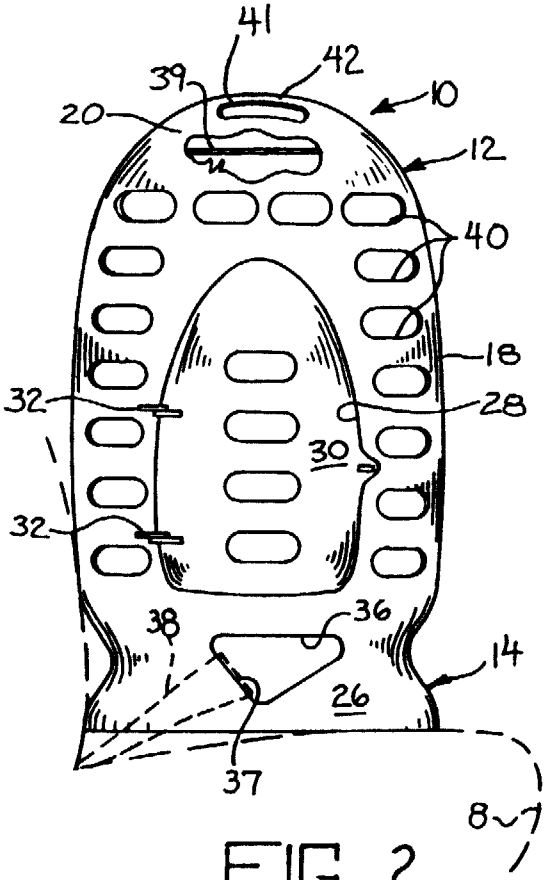
FIG. 2 is a side elevational view of the pet cage shown attached to a vehicle seat.
Figure 1:
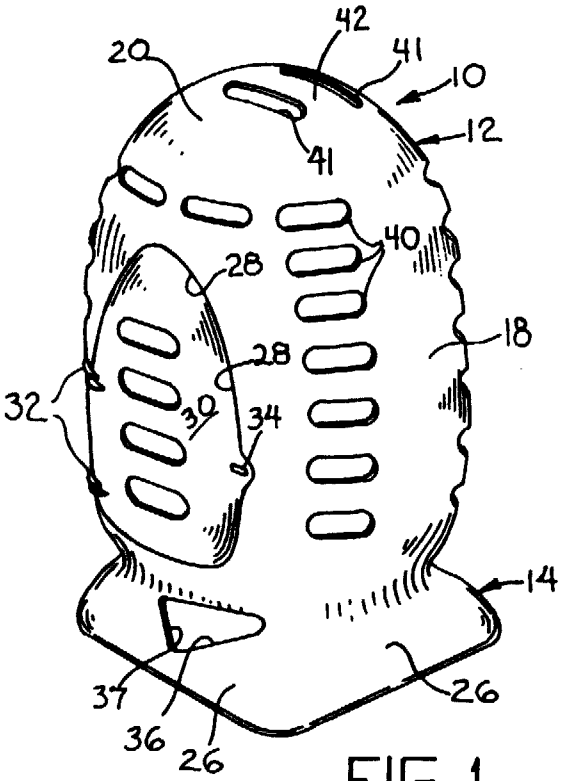
FIG. 1 is a perspective view of the invention.

The preferred embodiment herein disclosed is not intended to be exhaustive or to limit the application to the precise forms disclosed. Rather it is chosen and described in order that others skilled in the art might utilize its teachings.

As illustrated in the drawings, pet cage 10 includes a generally cylindrical housing 12 and an integral base 14 preferably formed from a molded clear plastic material. Housing 12 includes vertical side wall 18, top wall 20 and bottom wall 22. Base 14 extends from bottom wall 22 opposite wall 18 and includes sides 26. Two openings 28 are formed in side wall 18 to provide ingress and egress of the pet to be transported. Doors 30 [ar] *are* pivotally connected to housing side wall 22 by common hinges 32 to cover openings 28. Doors [80] *30* may be locked closed by common latches 34. An opening [86] *36* having a flattened side 37 is formed in opposing base sides 26 as illustrated in the figures. A plurality of vent openings 40 are formed in side wall 18. Two openings 41 are formed in top wall 20 define a handle 42 therebetween for carrying cage 10. An interior horizontal wall 39 is positioned between the upper row of vent openings 40 and openings 41 to isolate handle 42 from pet containment area 24 defined by walls 18, 22 and 39.

In use, pet cage 10 is placed on a vehicle seat 8. One end of a vehicle seat belt 38 is placed through both openings 36 and attached to its mating belt part as is common. The seat belt is tightened in a common manner to draw cage 10 tightly against the seat and seat back of the vehicle. When secured to the vehicle seat as described, bottom wall 22 is generally horizontal for safe transportation of animal 7 which is supported by wall 22. By threading the belt through openings 36 in base 14 the animal containment area 24 is unobstructed, which isolates the belt from the animal thereby protecting the belt from becoming soiled.

To transport pet cage 10 between vehicles a user grasps handle 42 and is isolated from contact with the animal by wall 39.

It should be understood that the invention is not to be limited to the precise form disclosed but may be modified within the scope of the appended claims.

I claim:

1. An animal cage comprising an integral housing and base, said housing including an outer side wall, a bottom wall, *and* a top wall [and an intermediate wall], said [intermediate] side [and], bottom *and top* walls defining an animal containment area, said outer side wall and said top wall including a plurality of openings therethrough for providing air flow into said animal containment area, an enlarged opening formed through said outer side wall constituting means for providing animal passage into and out of said containment area, said base being formed in one piece with said housing and extending below said housing bottom wall and defining openings therein that accommodates a vehicle seat belt, said housing bottom wall constituting a horizontal support for an animal, wherein said housing bottom wall isolates said vehicle seat belt from said containment area.

2. The animal cage of claim [1] *6*, wherein two of said openings in said top wall define [a] *said* handle therebetween; said *housing also includes an* intermediate wall *between said top and bottom walls* constituting a means for isolating said handle from said animal containment area.

3. In combination, an animal carrier and a vehicle seat, said vehicle seat including a restraint device connected to a support, said animal carrier including a housing having integral top, bottom and side walls [and an intermediate wall between said top and bottom walls]; said *top,* bottom, *and* side [and intermediate] walls defining an animal containment area, and an integral base extending downwardly from said bottom wall, said base including aligned opening therethrough, said restraint device passing through said aligned opening and constituting means for securing said carrier to said vehicle seat, said animal confinement area being spaced from said seat by said base.

4. The combination of claim 3 and vent openings formed through said housing side and top wall, two of said vent openings in said top wall defining a handle therebetween.

5. The combination of claim 4 [wherein said] *and a* intermediate wall constitutes means for isolating said handle from said animal containment area.

*6. The animal cage of claim 1 wherein said top wall also includes an integral handle.*

* * * * *